(12) United States Patent (10) Patent No.: US 8,538,559 B2
Hodson (45) Date of Patent: Sep. 17, 2013

(54) FIELDBUS SYSTEM FUNCTION BLOCK ENHANCEMENTS USING TRANSDUCER BLOCK

(75) Inventor: William R. Hodson, Telford, PA (US)

(73) Assignee: Relcom, Inc., Forest Grove, OR (US)

( * ) Notice: Subject to any disclaimer, the term of this patent is extended or adjusted under 35 U.S.C. 154(b) by 207 days.

(21) Appl. No.: 13/066,019

(22) Filed: Apr. 4, 2011

(65) Prior Publication Data

US 2012/0253477 A1 Oct. 4, 2012

(51) Int. Cl.
*G05B 11/01* (2006.01)
(52) U.S. Cl.
USPC .................................. 700/12; 700/18; 700/19
(58) Field of Classification Search
USPC .............. 700/12, 17, 18, 19, 21, 79
See application file for complete search history.

(56) References Cited

U.S. PATENT DOCUMENTS

| | | | | |
|---|---|---|---|---|
| 6,044,305 | A * | 3/2000 | Larson et al. | 700/87 |
| 6,236,334 | B1 * | 5/2001 | Tapperson et al. | 700/21 |
| 6,594,529 | B1 * | 7/2003 | Boggs et al. | 700/12 |
| 6,738,388 | B1 | 5/2004 | Stevenson et al. | |
| 6,963,781 | B2 * | 11/2005 | Fehrer et al. | 700/19 |
| 6,999,824 | B2 * | 2/2006 | Glanzer et al. | 700/18 |
| 7,117,052 | B2 * | 10/2006 | Lucas et al. | 700/28 |
| 7,272,457 | B2 * | 9/2007 | Glanzer et al. | 700/83 |
| 7,526,347 | B2 * | 4/2009 | Lucas et al. | 700/79 |
| 7,848,829 | B2 * | 12/2010 | Nixon et al. | 700/28 |
| 7,890,300 | B2 * | 2/2011 | De Groot et al. | 700/79 |
| 8,184,562 | B2 * | 5/2012 | Tapperson et al. | 700/11 |
| 2005/0027376 | A1 * | 2/2005 | Lucas et al. | 700/18 |
| 2005/0049727 | A1 * | 3/2005 | Tapperson et al. | 700/19 |
| 2009/0234465 | A1 * | 9/2009 | Korsten | 700/17 |
| 2011/0009985 | A1 * | 1/2011 | Nixon et al. | 700/87 |

\* cited by examiner

*Primary Examiner* — Charles Kasenge
(74) *Attorney, Agent, or Firm* — Chernoff, Vilhauer, McClung & Stenzel, LLP

(57) ABSTRACT

A process control system for a fieldbus network includes field devices having function blocks. Some distributed control systems access the standard parameters of the function blocks but cannot access manufacturers' non-standard parameters. Such parameters are placed in shared transducer blocks in the field devices where they are accessed by an alternate system for configuration and for collecting and monitoring data. This enables use by the function blocks of both standard and manufacturers' specific parameters and enables function blocks with only standard parameters to facilitate non-standard inter-function block communication connections using the shared transducer block parameters.

18 Claims, 9 Drawing Sheets

FIELDBUS SYSTEM FUNCTION BLOCK ENHANCEMENTS USING TRANSDUCER BLOCK

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Field of the Invention

The process control industry utilizes standard digital communications protocols. An example is the FOUNDATION Fieldbus protocol. This protocol allows sensors, actuators, indicators, control systems, configuration systems, asset managing systems, handheld tools, and more to communicate with each other and interoperate with each other, even to the point of allowing control algorithms to reside in field devices produced by differing manufacturers, if they conform to the communications and distributed control and process monitoring standards. This digital standard allows access not only to the process values being measured or control values to be set, but also allows access to configuration parameters to tune and select options within the control and measurement algorithms, allows access to performance data, allows access to diagnostic information, and more. This standard may be applied in various process industries such as refining, power generation, chemical processing, water and wastewater treatment, pharmaceutical, etc. Stevenson et al. (U.S. Pat. No. 6,738,388) shows an example of such a system.

The process control industry commonly controls a process using function blocks. Function blocks are tagged software elements that periodically or on-demand gather inputs, execute an algorithm, and produce outputs. They have logic and variables called parameters. Historically, function blocks had not been standardized within the process control industry.

Primarily for reasons of interoperability, the communications protocol standard defines a set of standard function blocks. However, it allows manufacturers to create extensions to standard function blocks, creating enhanced function blocks. These extensions generally require additional parameters to be used as inputs, outputs, and/or algorithm controls. A limitation for field device designers has been that not all configuration systems and control systems implement the complete FOUNDATION Fieldbus standard, in particular, the portion of the standard that provides for manufacturer-specific extensions to the standard function blocks. The standard allows field device manufacturers to add parameters and connections, called manufacturer extensions or manufacturer-specific parameters. Since some configuration systems and control systems do not support these extensions, the applicable market size is reduced for field devices that utilize extended features. This lack of support restrains creativity, inhibits improvements, and limits competition.

Historically, the state of the art for the field device designer was to choose one of two paths. The first path was to include the manufacturer-specific parameters and manufacturer-specific connections in one or more device enhanced function blocks and accept a smaller market of application for the device since a significant portion of the installed configuration systems and control systems did not support such manufacturer-specific extensions to standard function blocks. This was to the field device manufacturer's disadvantage as it limited the field of application.

The second path was to exclude the potential manufacturer-specific parameters and manufacturer-specific connections in function blocks in order to accommodate a larger market of application. However, the field device designer was then precluded from providing the customer with extended, inventive, creative, and useful features beyond the minimum required by the standard. This was also to the field device manufacturer's disadvantage and it limited additional value to the device.

DETAILED DESCRIPTION OF PREFERRED EMBODIMENTS

Figure 1:
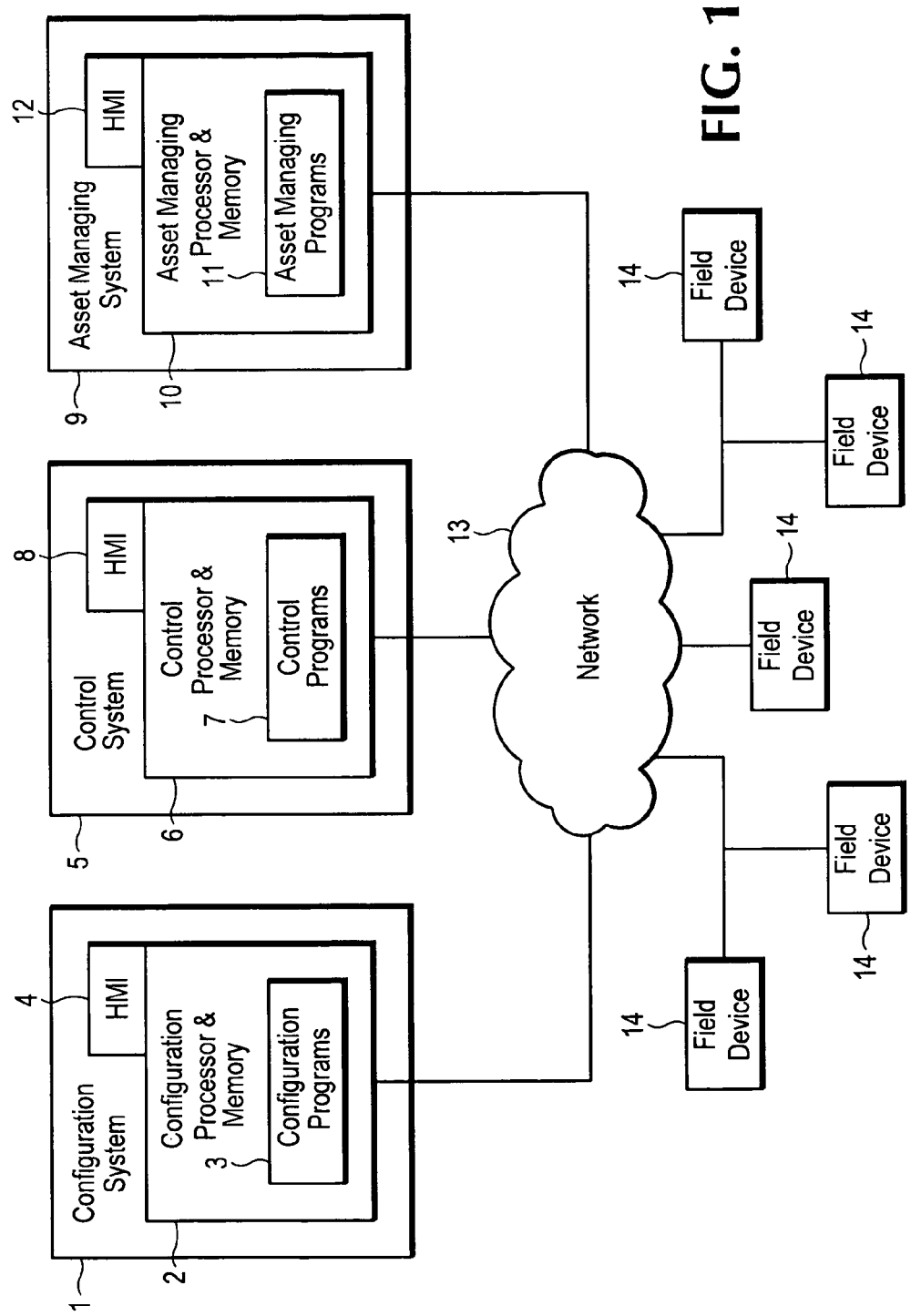
FIG. 1 is a schematic block diagram of an example of a process control network having a configuration system, control system, asset managing system, and distributed field devices.

An enhanced function block is a function block that contains all the features, functions, parameters, and controls of a standard function block plus one or more manufacturer-specific parameters which may be used to provide one or more additional functional features associated with that function block. The system described herein provides for a plurality of functional extensions to standard function blocks, beyond the standard functions defined as part of the standard function blocks. However, since some configuration and control systems do not support manufacturer-specific parameters in function blocks, this invention uses an alternate method.

It utilizes one or more shared transducer blocks to be used as a communicative coupling mechanism between a plurality of standard function blocks (with only standard parameters) within a device in order to permit functional extensions similar in capabilities to those that would be accomplished using manufacturer-specific function block parameters, input connections, and output connections within a standard function block base, rendering the functionality of an enhanced function block but without adding non-standard parameters to the standard function blocks. The manufacturer-specific parameters which are utilized by the function blocks are actually associated with the shared transducer block, instead of in the function blocks and are communicatively coupled between the function blocks and the transducer block. This is useful because asset-managing systems generally do provide access to manufacturer-specific parameters in transducer blocks, even though control systems and asset managing systems may not provide such access to manufacturer-specific parameters in function blocks. Each standard function block communicates with the manufacturer-specific parameters located within the associated transducer block. A function block can locate its associated transducer block by using an internal communication mechanism which is not part of the communications standard except for the use of a parameter called CHANNEL which contains manufacturer-specific information regarding the association between function blocks and associated transducer blocks. The name of the CHANNEL parameter is standardized, as is its data type and size, but the meaning of its values are defined by the device manufacturer.

Another aspect of this invention provides for function blocks needing to communicate with each other that cannot do so using standard output parameters connected to standard input parameters. Such function blocks may communicate with each other by storing and reading values in one or more shared transducer blocks which they access within the field device using shared parameters.

Hence, both the creation of manufacturer-specific parameters and the ability to communicate beyond the standard interconnections is made possible by this invention, even though a configuration system and control system may not support such extensions to standard function blocks. The manufacturer-specific parameters are located in the shared transducer block. Manufacturer-specific transducer block parameters are generally supported by asset managing systems.

DEFINITIONS

| | Definitions |
|---|---|
| Asset managing system: | As used herein, a generic computer-based system that collects and monitors performance and diagnostic data from process-related field devices (typically measurement sensors and process actuators such as valves and motor speed controllers) in order to provide plant maintenance personnel and management personnel with information and alerts regarding existing or potential failures of process-related equipment. |
| Control System: | A system whose function is to automatically control or assist in the control of a process such as refining, producing chemicals, producing electric power, purifying water, processing wastewater, manufacturing cement, etc. |
| Discrete Input: | An input whose values are discrete such as ON or OFF, TRUE or FALSE; OFF, STARTING, RUNNING, or STOPPING, etc. |
| Discrete Output: | An output whose values are discrete such as ON or OFF, TRUE or FALSE; START or STOP, etc. |
| Distributed Control System (DCS): | A control system whose functional elements are physically and logically distributed and interconnected via a communication system, typically a network. |
| Enhanced Function Block: | A standard function block which meets the requirements of the standard function block but contains additional features or enhancements made accessible by one or more manufacturer-specific parameters which may include additional input and/or additional output parameters used as connections. |
| Fieldbus: | An industrial computer network protocol used for real-time distributed control. |
| FOUNDATION Fieldbus: | A digital communication and process control standard specific to and promoted by the Fieldbus Foundation. |
| Function Block: | A named structure containing parameters that control the execution of an associated algorithm which, in general, periodically acts on inputs and produces outputs. |
| Manufacturer-Specific Parameter: | A parameter which is not standardized by an entity having such authority, but rather defined by a manufacturer entitled to do so. |
| Parameter: | Block parameters define the inputs, outputs, and the data used to control block operation. They are generally visible and accessible over the network. |
| Shared Transducer Block: | A transducer block that is associated with more than one function block for the purpose of allowing two or more function blocks to communicate to each other and/or provide parameter storage for one or more associated function blocks. |
| Standard Parameter: | A parameter standardized by an entity having such authority. |
| Standard Function Block: | A function block standardized by the entity having such authority, for example, the Fieldbus Foundation. A standard function block performs all the functions required by the standard. |
| Transducer Block: | A named structure containing parameters that control the execution of an associated algorithm which, in general, periodically or on demand acts on process measurement inputs and/or produces process control or actuator outputs |

Abbreviations
DCS: Distributed Control System
HMI: Human Machine Interface—a mechanism for a human to view and possibly alter values associated with a computer program and its memories.

The Fieldbus communication system interconnects control systems, configuration systems, asset managing systems, field devices (e.g. sensors and actuators), and the like. FIG. 1 shows an example of a typical arrangement. In this example, there is the following:

A configuration system 1, also sometimes called a configuration tool, composed of one or more configuration processors and memories 2 containing one or more configuration programs 3 and one or more human-machine interfaces (HMIs) 4 which may also be remote to the configuration system. The configuration system provides configuration services for the various devices and network connections involved with communications. Configuration may be performed on-line, communicating to connected devices. Configuration may also be performed off-line, in a database, with the resultant values downloaded to the other devices at a later time. Configuration includes establishing network parameters, establishing device system parameters, establishing parameters for resource blocks, function blocks, and transducer blocks, interconnecting function blocks internally within a device and externally between devices, establishing a publication schedule for the communications link, and so forth.

A control system 5, also sometimes called a distributed control system (DCS), composed of one or more control processors and memories 6 containing one or more control programs 7 and one or more human-machine interfaces (HMIs) 8 which may also be remote to the control system. A control system gathers process measurement values from field sensor devices in order to monitor and control the process. Control algorithms allow the control system to compute needed changes to the process, per operator-provided setpoints. The control system can then alter the process via communications to field actuator devices such as control valves and motor speed controls. The control system also can provide alerting about deviant measured process values, useful displays for the benefit of the operators, reports of performance for plant management, and the like.

An asset managing system 9, also sometimes called a field device management system, composed of one or more asset managing processors and memories 10 containing one or more asset managing programs 11 and one or more human-machine interfaces (HMIs) 12 which may also be remote to the asset managing system. The asset managing system generally monitors the field device performance and diagnostic parameters, alerting its users and operators to existing, imminent, pending, scheduled, or potential needs for maintenance services. It typically would produce a prioritized list of field equipment (sensors, actuators, and the like) that have failed, are not functioning well, are showing signs of impending failure, are scheduled for maintenance based on calendar time or operating time, and the like.

It is also possible for any two or more systems of the above configuration, control, and asset managing systems to be combined into one. For example, a distributed control system may contain a configuration system within itself or may contain an asset managing system within itself.

One or more networks 13 (or fieldbus communications systems) may be used to interconnect the above systems and one or more field devices 14. The networks may be of differing communications speeds using specialized devices to interface lower speed and higher speed sub-networks together.

Figure 2:
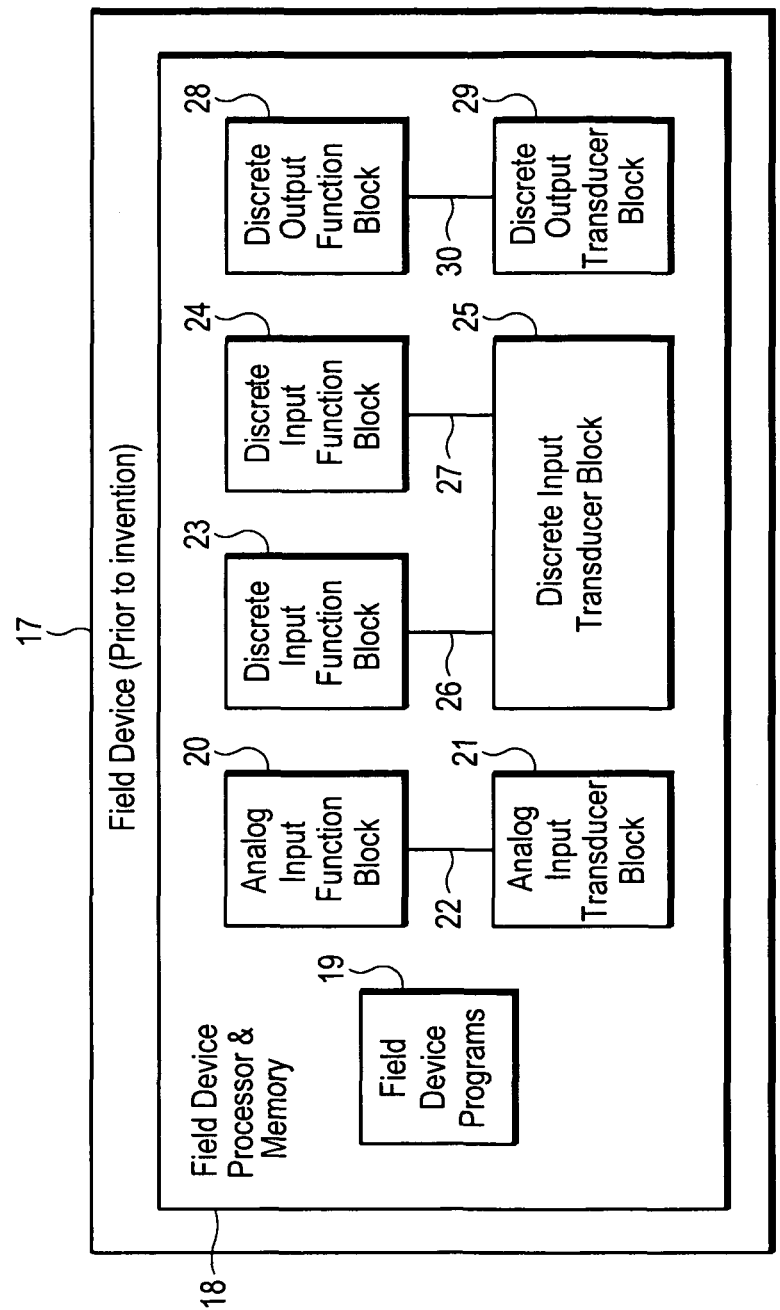
FIG. 2 is a schematic block diagram of typical field device with function blocks.

A Field Device (e.g., 14) of FIG. 1 is further detailed in the example of FIG. 2. In this example of field devices prior to this invention, Field Device 17 contains processor and memory 18, field device programs 19, and four function blocks and three transducer blocks. An analog input function block 20 is associated with an analog input transducer block 21 by way of an internal connection 22. The standard analog input transducer block scans an input value from an associated sensor based on its configured parameters. The standard analog input function block communicates an input measurement value provided by the analog input transducer block and converts it to desired engineering units, can filter the value to reduce the effect of noise, compares the value to alarm limits, and can generate an alarm alert when limits are exceeded. It also provides for manual value substitution if needed and for other features. The analog input transducer block provides the logic and needed parameter values to properly process the desired measurement value through the hardware interface.

Two discrete input function blocks 23 and 24 share a discrete input transducer block 25, but not for the purpose of communications between the associated function blocks 23 and 24 or for the purpose of containing one or more manufacturer-specific parameters that would provide functionality expected in the associated function blocks 23 and 24. The internal connection 26 provides only an association between discrete input function block 23 and discrete input transducer block 25, but not between discrete input function block 23 and discrete input function block 24. The internal connection 27 provides only an association between discrete input function block 24 and discrete input transducer block 25, but not between discrete input function block 23 and discrete input function block 24. The standard discrete input transducer block scans an input status value from an associated discrete sensor based on its configured parameters. The standard discrete input function block obtains an input value from the discrete input transducer block and may invert its value, can filter the value to reduce the effect of noise, compares the value to an alarm limit, and can generate an alarm alert when the limit is exceeded. It also provides for manual value substitution if needed and for other features. The discrete input transducer block provides the logic and needed parameter values to properly process the desired status value through the hardware interface.

Lastly, a discrete output function block 28 is associated with a discrete output transducer block 29 by way of an internal connection 30. The discrete output function block accepts a target value from the operator or via another function block, may invert it, and provides it to the discrete output transducer block. It also provides for manual value substitution if needed and for other features. The discrete output transducer block provides the logic and needed parameter values to properly process the desired discrete value through the hardware interface.

Figure 3:
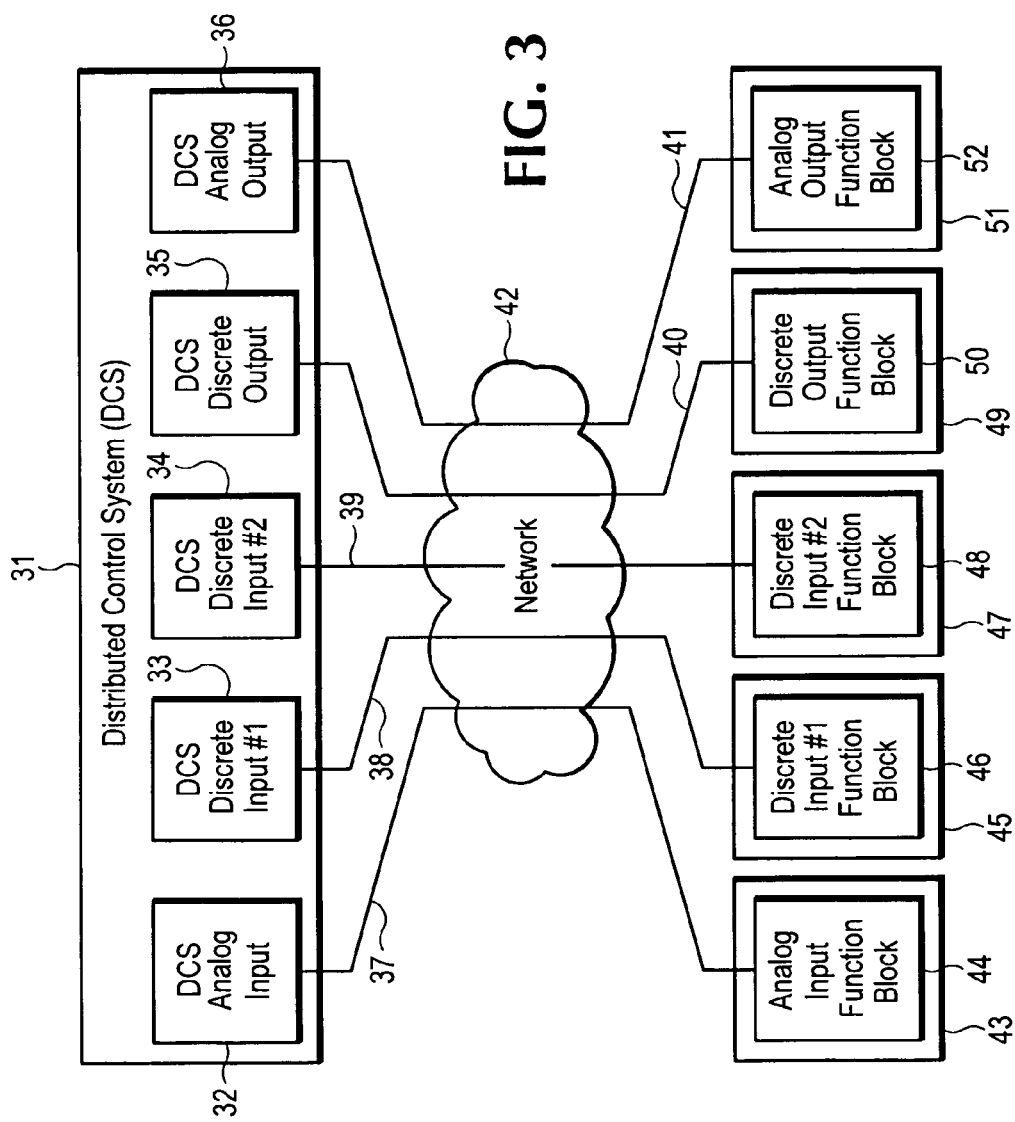
FIG. 3 is a schematic block diagram showing an example of communicative connections between a control system and function blocks within field devices.

An example of communicative coupling via the network is shown in the schematic diagram of FIG. 3. The control system 31, also called distributed control system, contains communicative couplings via a network to the function blocks that reside in the field devices. DCS analog input 32 is communicatively coupled via connection 37 through network 42 to analog input function block 44 in field device 43. DCS discrete input #1 33 is communicatively coupled via connection 38 through network 42 to discrete input #1 function block 46 in field device 45. DCS discrete input #2 34 is communicatively coupled via connection 39 through network 42 to discrete input #2 function block 48 in field device 47. DCS discrete output 35 is communicatively coupled via connection 40 through network 42 to discrete output function block 50 in field device 49. DCS analog output 36 is communicatively coupled via connection 41 through network 42 to analog output function block 52 in field device 51.

The communicative coupling between the function blocks typically uses a communication mechanism called publication-subscription, wherein the device containing the producing function block publishes a value to the network and the device containing the consuming function block subscribes to the published value. In order to facilitate the communicative coupling between the function blocks, a publication schedule, sometimes called a link schedule, is produced by the configuration system.

Figure 4:
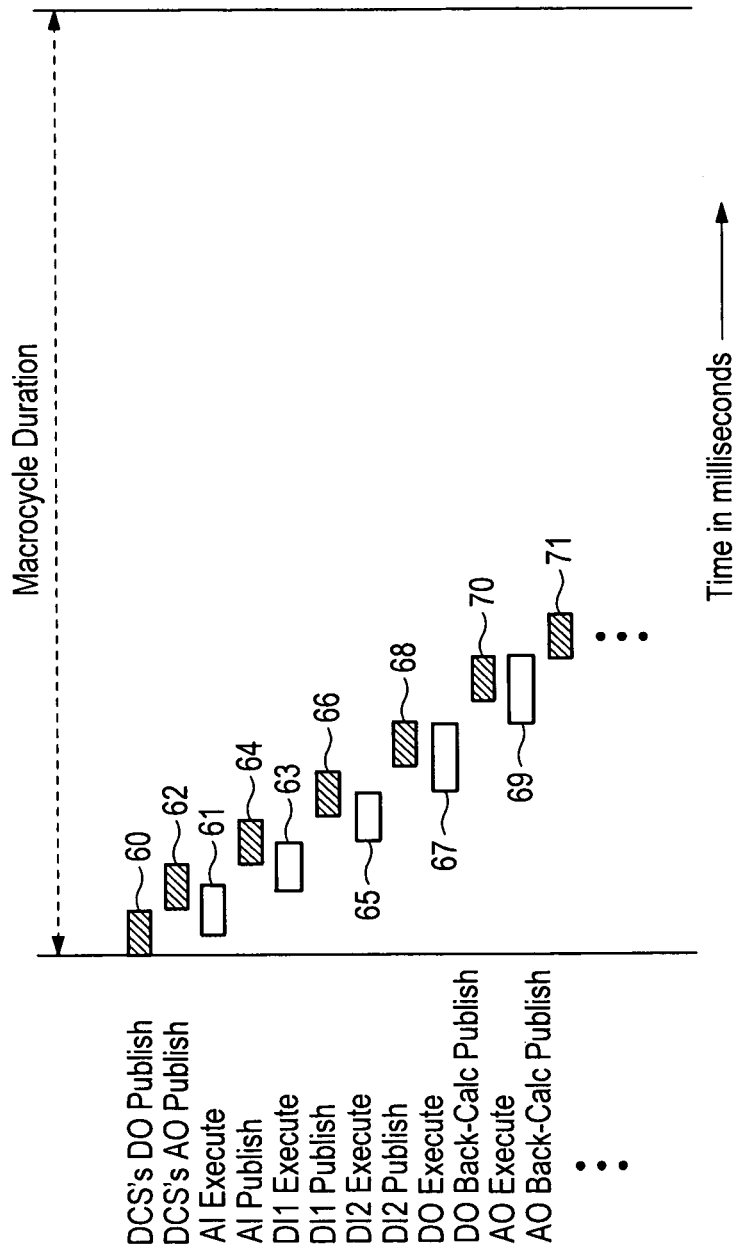
FIG. 4 is a timing diagram showing an example of a function block execution and network publication schedule.

FIG. 4 is an example of a publication schedule shown as a timing chart that could be used to provide the communicative coupling needed in FIG. 3. The timing chart contains indications of both when to execute a function block and when to publish its outputs, all expressed relative to the start of a periodically repetitive schedule called the macrocycle. The duration of the macrocycle determines the periodicity of execution and of publication, although a block may execute or publish more than one time during a macrocycle.

No more than one device may publish a function block output to the network at the same time. In a single processor device, no more than one function block may execute at the same time. The schedule is intended to publish a value close to the time it is produced so that it is available and fresh.

In FIG. 4, the macrocycle schedule indicates that the control system (DCS) is scheduled 60 to publish a discrete output to the network. Next, the analog input function block in a field device is scheduled 61 to execute. When publication 60 has completed, the control system (DCS) is scheduled to publish 62 an analog output to the network. When the execution of the analog input function block 61 has completed, the device is scheduled 63 to execute discrete input #1 function block. When publication 62 has completed, the field device is scheduled to publish 64 an analog input to the network. When the execution of the discrete input #1 function block 63 has completed, the device is scheduled 65 to execute discrete input #2 function block. When publication 64 has completed, the field device is scheduled to publish 66 a discrete input #1 to the network. When the execution of the discrete input #2 function block 65 has completed, the device is scheduled 67 to execute a discrete output function block. When publication 66 has completed, the field device is scheduled to publish 68 a discrete input #2 to the network. When the execution of the discrete output function block 67 has completed, the device is scheduled 69 to execute an analog output function block. After publication 68 has completed, the field device is scheduled to publish 70 a back-calculation value from the discrete output function block to the network. When the execution of the analog output function block 69 has completed, no more executions of function blocks are scheduled until the macrocycle repeats itself after the macrocycle duration has expired. When publication 70 has completed, the field device is scheduled to publish 71 a back-calculation value from the analog output function block to the network. When publication 71 has completed, no further publications are scheduled until the macrocycle repeats itself after the macrocycle duration has expired. This macrocycle schedule, also called a link schedule or link active schedule, is downloaded to devices that require it. Synchronization of publications and function block execution timing is maintained by devices sharing a common knowledge of time.

Figure 5:
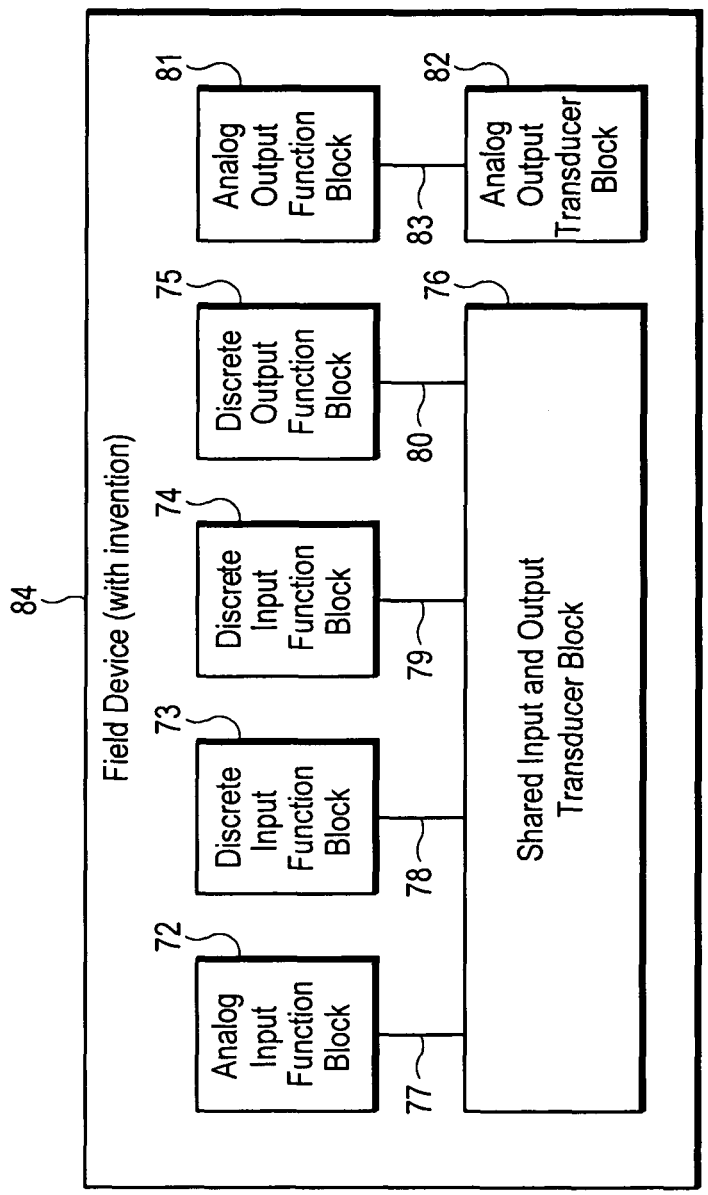
FIG. 5 is a schematic block diagram of typical field device with function blocks as implemented using the invention.

FIG. 5 shows the use of this invention within the field device 84. In this example, an analog input function block 72, discrete input function block 73, second discrete input function block 74, and discrete output function block 75 all share a shared input and output transducer block 76 each through its own internal connection 77, 78, 79, and 80, respectively. A function block can locate its associated transducer block by using an internal connection mechanism which is not part of the communications standard except for the use of a parameter called CHANNEL which contains manufacturer-specific information regarding the association between function blocks and associated transducer blocks. The CHANNEL parameter is standard in name, data type, and size, but the interpretation of its value is open to each manufacturer's own specific definition.

In this example, the shared transducer block is utilized for (in addition to interfacing and accessing the process measurement input hardware and process actuation output hardware) [1] communications among the analog input function block 72, discrete input function block 73, second discrete input function block 74, and discrete output function block 75 and [2] storage of one or more manufacturer-specific parameters for benefit of any of the associated function blocks. For example, if the state of the physical discrete output associated with the discrete output function block 75 should be OFF whenever the value of the physical analog input associated with the analog input function block 72 is in an active alarm condition because it is above a high limit, such an option for the discrete output function block 75 is indicated via a manufacturer-specific parameter stored in the shared input and output transducer block 76 and the state resulting from the analog input function block's 72 high alarm condition will be stored in the shared input and output transducer block 76 for the discrete output function block 75 to observe. In other words, the analog input function block 72 communicates its alarm state to the discrete output function block 75 via shared storage in the shared input and output transducer block 76. In this example, both the analog input function block 72 and discrete output function block 75 have specialized logic, in addition to the standard logic, to facilitate this communications through the shared input and output transducer block.

Also in this example, analog output function block 81 is associated with an analog output transducer block 82 by way of an internal connection 83, independent of the shared input and output transducer block 76.

Figure 6:
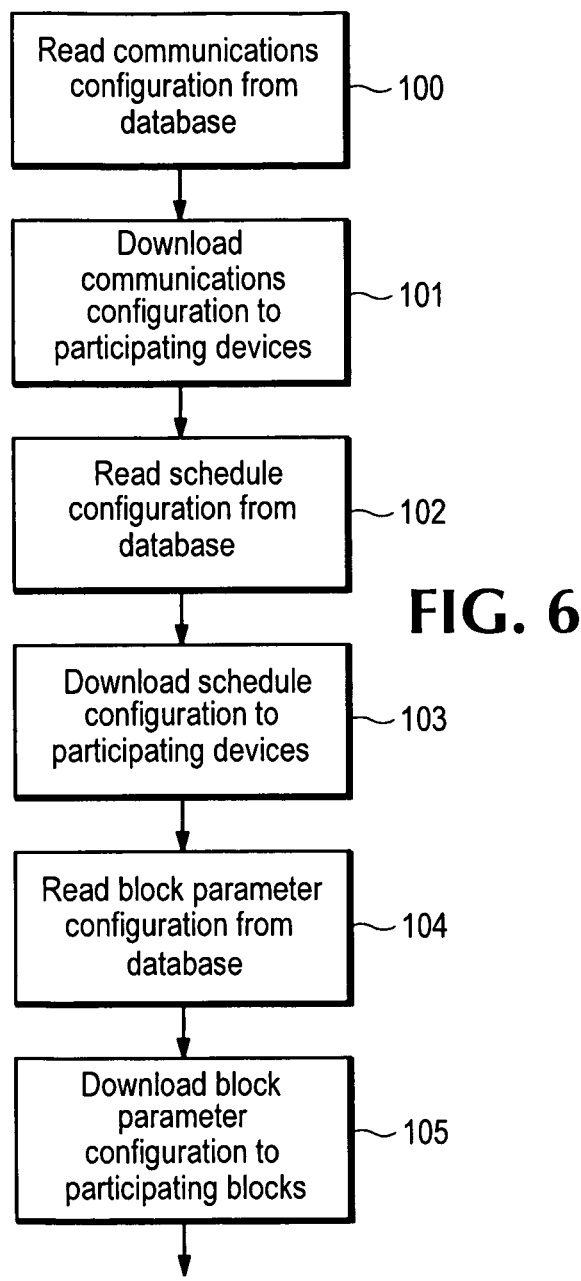
FIG. 6 is a flow chart illustrating configuration downloads for communications configuration, publication and function block execution schedule, and function block parameters.

FIG. 6 illustrates an example of a flow chart for software which downloads a configuration database. The user, using the configuration system, prepares a configuration database describing the communicating devices of the network, the interconnections between function blocks throughout the network, and the timing of the execution of the function blocks. The timing of publications of values to the network is usually derived by the configuration software program. A block 100 receives the configuration of the communicating devices from the configuration database for block 101 to download appropriate portions to each device participating in the communications. A block 102 receives the configured schedule from the configuration database for block 103 to download appropriate portions to each device participating in the scheduled communications and execution of scheduled function blocks. A block 104 receives the configuration of the block parameter values (for resource blocks, function blocks, transducer blocks) from the configuration database for block 105 to download appropriate downloadable parameter values to each block within devices participating in the communications.

Figure 7:
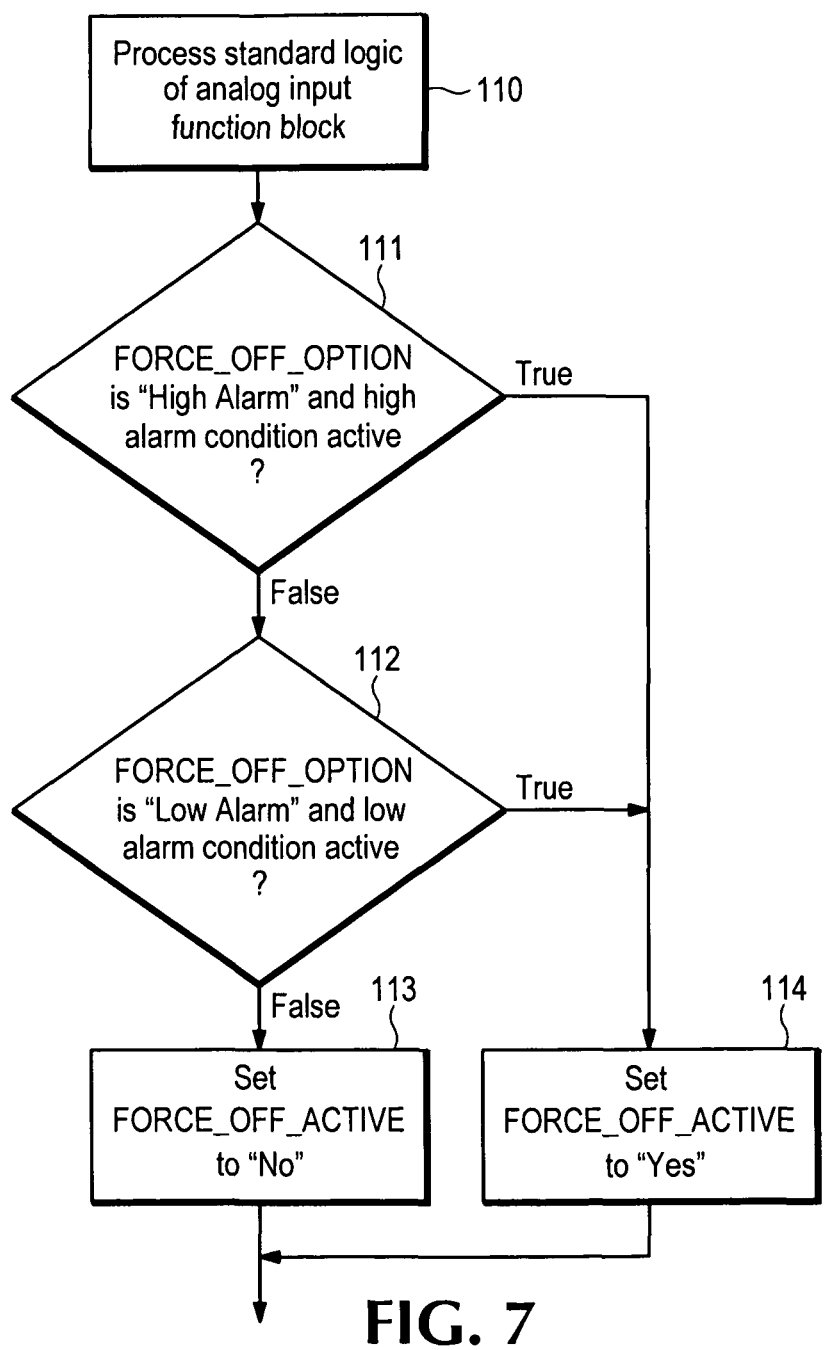
FIG. 7 is a flow chart illustrating the processing of an analog input function block with a manufacturer-specific enhancement which can communicate to a discrete output function block without using function block-contained manufacturer-specific output parameters.

FIG. 7 illustrates an example of a flow chart for the analog input function block 72 of FIG. 5. In FIG. 5 the analog input function block 72 has only the standard function block parameter set. The shared input and output transducer block 76 contains two non-standardized manufacturer-specific parameters FORCE_OFF_OPTION and FORCE_OFF_ACTIVE in this example. Each standard function block can communicate with the manufacturer-specific parameters located within the associated transducer block.

The FORCE_OFF_OPTION parameter is an enumerated parameter that can take on one of three user-determined discrete values of "Never", "High Alarm", or "Low Alarm". The user selects a value at the time of configuration. The default value is "Never". If the value of "Low Alarm" is selected, the occurrence of a low alarm condition in the analog input function block will cause the discrete output function block to force itself to an OFF state. If the value of "High Alarm" is selected, the occurrence of a high alarm condition in the analog input function block will cause the discrete output function block to force itself to an OFF state. If the value of "Never" is selected or there by default, then neither the occurrence of a high alarm condition nor the occurrence of a low alarm condition in the analog input function block will cause the discrete output function block to force itself to an OFF state.

The FORCE_OFF_ACTIVE parameter is an enumerated parameter that can take on one of two function block-determined discrete values of "Yes" or "No". If the value of "High Alarm" is selected in the FORCE_OFF_OPTION parameter, the analog input function block will access the FORCE_OFF_ACTIVE parameter in the shared input and output transducer block and will set its value to "Yes" if there is an active occurrence of a high alarm condition in the analog input function block or will set its value to "No" if there is no active occurrence of a high alarm condition in the analog input function block. If the value of "Low Alarm" is selected in the FORCE_OFF_OPTION parameter, the analog input function block will access the FORCE_OFF_ACTIVE parameter in the shared input and output transducer block and will set its value to "Yes" if there is an active occurrence of a low alarm condition in the analog input function block or will set its value to "No" if there is no active occurrence of a low alarm condition in the analog input function block. If the value of "Never" is selected in the FORCE_OFF_OPTION parameter, the analog input function block will access the FORCE_OFF_ACTIVE parameter in the shared input and output transducer block and will set its value to "No".

The example flow chart in FIG. 7 shows that the standard portion of the analog input function block is executed in block 110. After completion of the alarm determination portion of the standard function block logic, a test is made to determine if the FORCE_OFF_OPTION parameter is set to "High Alarm" and if a high alarm condition is active in 111. If not, a similar test is made to determine if the FORCE_OFF_OPTION parameter is set to "Low Alarm" and if a low alarm condition is active in 112. If neither of these conditions is true, box 113 will set the FORCE_OFF_ACTIVE parameter in the shared input and output transducer block 76 to "No". If either of these conditions is true, box 114 will set the FORCE_OFF_ACTIVE parameter in the shared input and output transducer block 76 to "Yes".

Figure 8:
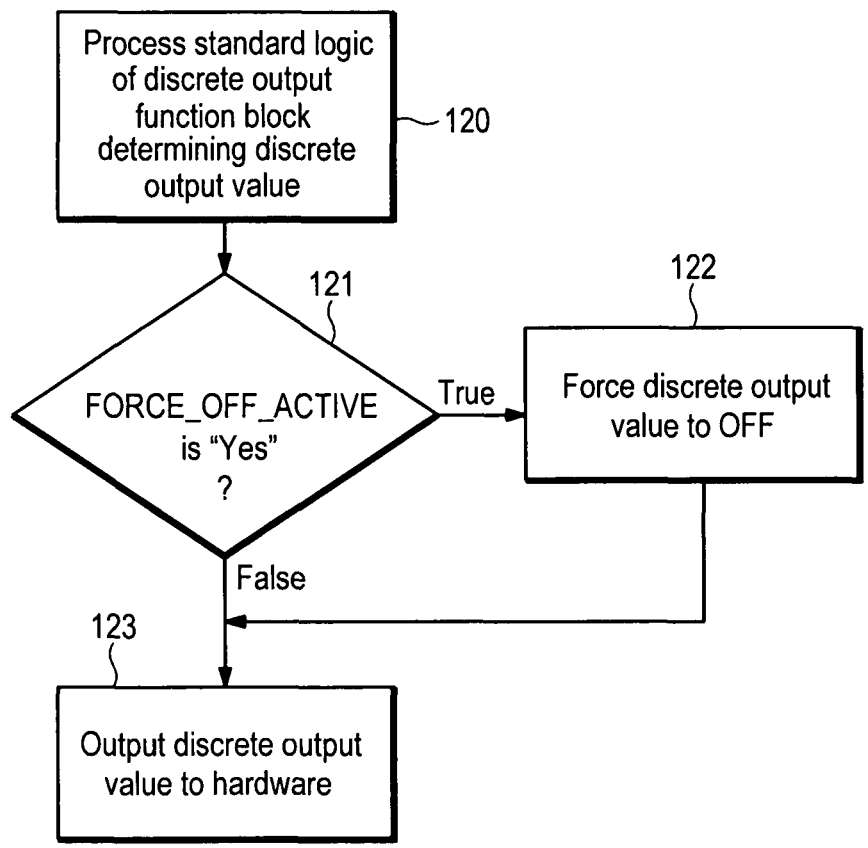
FIG. 8 is a flow chart illustrating the processing of a discrete output function block with a manufacturer-specific enhancement which can receive communication from an analog input function block without using function block-contained manufacturer-specific input parameters.

FIG. 8 illustrates a flow chart for the discrete output function block of FIG. 5. In FIG. 5 the discrete output function block 75 has only the standard function block parameter set. The shared input and output transducer block 76 contains two non-standardized manufacturer-specific parameters FORCE_OFF_OPTION and FORCE_OFF_ACTIVE.

The flow chart in FIG. 8 shows that a standard portion of the discrete output function block is executed in block 120. In block 121, a test is made of the manufacturer-specific parameter FORCE_OFF_ACTIVE. If the value of FORCE_OFF_ACTIVE is "Yes", the discrete output value will be forced to OFF in block 122 regardless whether it was to be ON or OFF before this point. If the value of FORCE_OFF_ACTIVE is not "Yes", the discrete output value will be unaltered. Block 123 will output the discrete output value to the hardware.

In summary, the analog input function block 72 can communicate its alarm condition to the discrete output function block 75 without the analog input function block 72 having its own manufacturer-specific output parameter to provide it, and without the discrete output function block 75 having its own manufacturer-specific input parameter to accept it. This is accomplished by the analog input function block 72 communicating its alarm condition through (writing its alarm condition to) the manufacturer-specific parameter FORCE_OFF_ACTIVE located in the shared input and output transducer block followed by the discrete output function block 75 reading the same said condition by way of the same said manufacturer-specific parameter FORCE_OFF_ACTIVE located in the same said shared input and output transducer block. This provides a manufacturer-specific communications connection that is supported by systems that support manufacturer-specific parameters in transducer blocks, even though they may not support manufacturer-specific parameters in function blocks.

Further, configuration parameters such as FORCE_OFF_OPTION are manufacturer-specific but reside, per this invention, in the shared input and output transducer block rather than directly in the function block. This provides manufacturer-specific configuration options that are supported by systems that support manufacturer-specific parameters in transducer blocks, even though they may not support manufacturer-specific parameters in function blocks.

Figure 9:
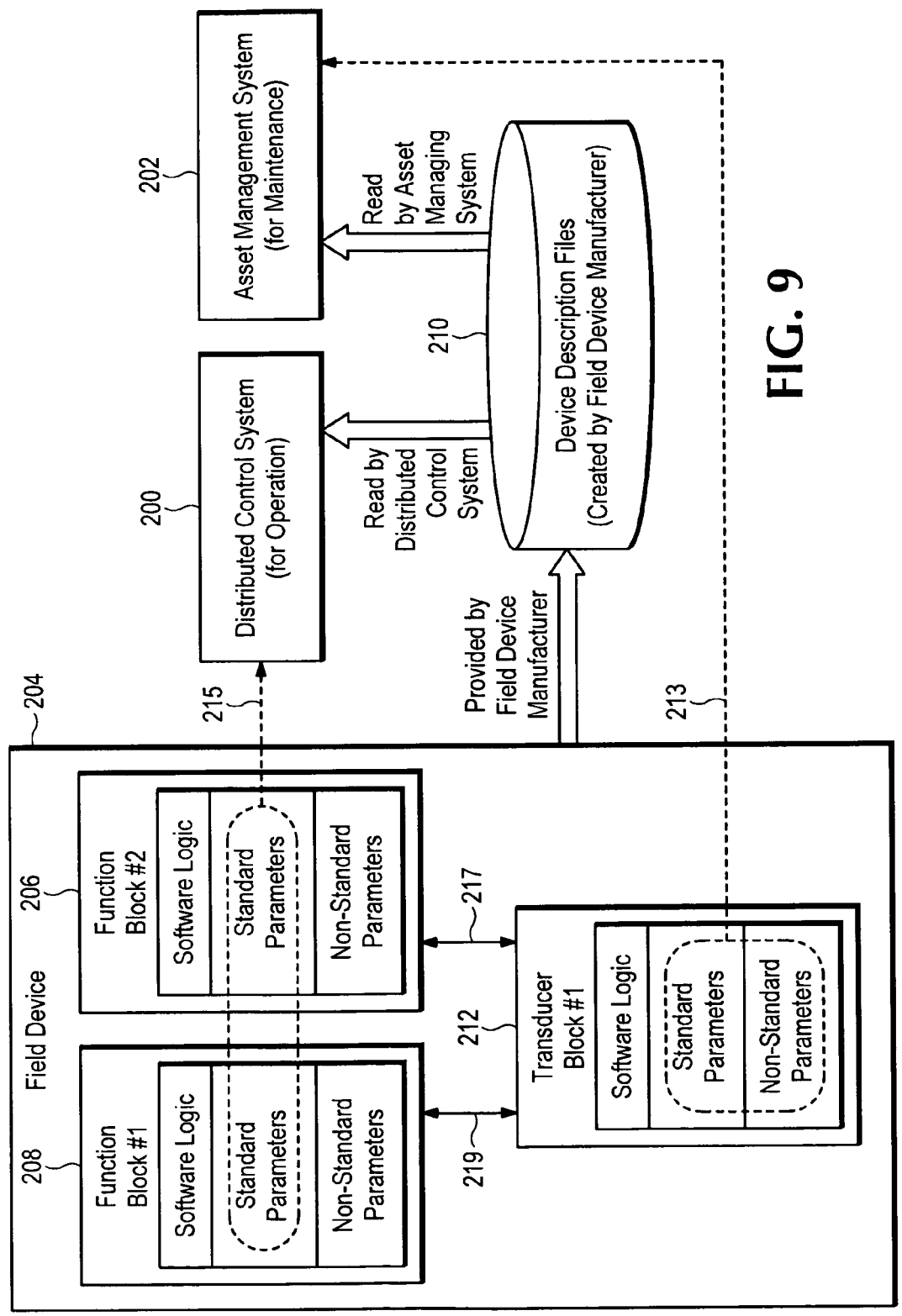
FIG. 9 is a schematic diagram of a process control system illustrating the working of the invention.

Reference is made to FIG. 9, which illustrates the structure of an embodiment of the system. A fieldbus network as illustrated in FIG. 1 contains at least one field device 204. The field device 204 includes at least two function blocks 206 and 208 and a shared transducer block 212. All of the device description files 210 include both standard and non-standard parameters (which exist in software in the field device 204). These description files are accessed and read by the distributed control system 200 and the asset management system 202. However, the distributed control system 200 accesses only standard parameters from the function blocks 206 and 208 as indicated by dotted line 215. It cannot access the non-standard parameters. The asset management system 202 is an alternate system for collecting and monitoring data from the field device 204. The alternate system 202 does access the non-standard parameters that are in the shared transducer block 212 as indicated by dotted line 213. For this reason, non-standard parameters that would otherwise be located in function blocks are located instead in an associated transducer block, and links (denoted by the arrows 217 and 219) are formed between the function blocks 206 and 208 to access these parameters and to communicate to each other using these non-standard parameters.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. In an industrial control system having a fieldbus network,
   (a) A field device having at least first and second function blocks, each of said function blocks having at least one input or at least one output, the function blocks including standard parameters,
   (b) A control system for communicating with the field device, said control system being capable of accessing said standard parameters but incapable of accessing manufacturer-specific parameters,
   (c) An alternate system for collecting and monitoring data from the field device and capable of accessing both said standard and said manufacturer-specific parameters, and
   (d) Said field device further including a shared transducer block operatively storing said manufacturer-specific parameters, said shared transducer block being operatively coupled to said first and second function blocks internally within said field device whereby said first and second function blocks are in communication with one another.

2. The industrial control system of claim 1 wherein all function blocks in the industrial control system conform to the FOUNDATION fieldbus standard.

3. The industrial control system of claim 1 wherein at least one of said function blocks is a discrete function block.

4. The industrial control system of claim 1 wherein at least one of said function blocks is a discrete control function block.

5. The industrial control system of claim 4 wherein said discrete control function block accepts analog measurements.

6. The industrial control system of claim 1 wherein at least one of said function blocks is discrete output function block.

7. In an industrial control system on a fieldbus network having at least one field device, and having a control system for utilizing standard parameter functions of the field device, the field device having at least a pair of function blocks which include standard parameters, an improvement comprising:
   (a) A field device having at least first and second function blocks, each of said function blocks having at least one input or at least one output, the function blocks including standard parameters,
   (b) Said control system being in communication with the field device, and capable of accessing said standard parameters but incapable of accessing manufacturer-specific parameters,
   (c) An alternate system for collecting and monitoring data from the field device and capable of accessing both said standard and manufacturer-specific parameters, and
   (d) Said field device further including a shared transducer block operatively storing said manufacturer-specific parameters, said shared transducer block being operatively coupled to said first and second function blocks internally within said field device whereby said first and second function blocks are in communication with one another.

8. The industrial control system of claim 7 wherein all function blocks in the industrial control system conform to the FOUNDATION fieldbus standard.

9. The industrial control system of claim 7 wherein at least one of said function blocks is a discrete function block.

10. The industrial control system of claim 7 wherein at least one of said function blocks is a discrete control function block.

11. The industrial control system of claim 10 wherein said discrete control function block accepts analog measurements.

12. The industrial control system of claim 7 wherein at least one of said function blocks is discrete output function block.

13. In an industrial control system having a fieldbus network,
   (a) A field device having at least a first function block, said function block having at least one input or at least one output, the function block having only standard parameters,
   (b) A control system for controlling the operation of the field device, said control system being capable of accessing said standard parameters but incapable of accessing manufacturer-specific parameters,
   (c) An alternate system for collecting and monitoring data from the field device and capable of accessing both said standard and said manufacturer-specific parameters, and
   (d) Said field device further including a transducer block operatively storing said manufacturer-specific parameters, said transducer block being operatively coupled to said first function block internally within the device whereby said first function block accesses said manufacturer-specific parameters so as to enable use of both the standard parameters of the function block and the manufacturer-specific parameters of the transducer block.

14. The industrial control system of claim 13 wherein all function blocks in the industrial control system conform to the FOUNDATION fieldbus standard.

15. The industrial control system of claim 13 wherein at least one of said function blocks is a discrete function block.

16. The industrial control system of claim 13 wherein at least one of said function blocks is a discrete control function block.

17. The industrial control system of claim 16 wherein said discrete control function block accepts analog measurements.

18. The industrial control system of claim 13 wherein at least one of said function blocks is a discrete output function block.

* * * * *